United States Patent
Brand et al.

(10) Patent No.: US 11,712,963 B2
(45) Date of Patent: Aug. 1, 2023

(54) CONTROL MODULE FOR ADJUSTING FLAPS OF A VEHICLE

(71) Applicant: MCi (Mirror Controls International) NETHERLANDS B.V., Woerden (NL)

(72) Inventors: Marius Brand, Woerden (NL); Bastiaan Huijzers, Woerden (NL); Jinku Hu, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 0 days.

(21) Appl. No.: 17/865,648

(22) Filed: Jul. 15, 2022

(65) Prior Publication Data
US 2022/0348073 A1 Nov. 3, 2022

Related U.S. Application Data

(63) Continuation of application No. 16/479,869, filed as application No. PCT/NL2018/050047 on Jan. 23, 2018, now Pat. No. 11,524,570.

(30) Foreign Application Priority Data

Jan. 23, 2017 (NL) ..................................... 2018212

(51) Int. Cl.
*B60K 11/08* (2006.01)
*B60W 10/30* (2006.01)
(Continued)

(52) U.S. Cl.
CPC .......... *B60K 11/085* (2013.01); *B60R 16/023* (2013.01); *B60R 16/03* (2013.01);
(Continued)

(58) Field of Classification Search
CPC ..... B60K 11/085; B60R 16/023; B60R 16/03; B60W 10/30; B60W 2050/046;
(Continued)

(56) References Cited

U.S. PATENT DOCUMENTS 4,871,954 A * 10/1989 Rathgeber .............. G05B 19/40
                                                        318/466
5,339,782 A    8/1994 Gölzer et al.
(Continued)

FOREIGN PATENT DOCUMENTS

CN      104149602 A      11/2014
CN      104228553 A      12/2014
(Continued)

OTHER PUBLICATIONS

KR20130016795A Translate (Year 2013).
KR20160050792A Translate (Year 2016).

*Primary Examiner* — B M M Hannan
(74) *Attorney, Agent, or Firm* — Volpe Koenig

(57) ABSTRACT

A control unit is presented for controlling a driving unit arranged for adjustment of one or more first air guiding flaps of a motorised vehicle between a first outer position and a second outer position. The control unit comprises a communication module for communicating with a vehicle control network for receiving first adjustment instructions for adjusting the first flap, a power supply module comprising an input power terminal for receiving power from a vehicle power network and a first output power terminal for supplying a first current to the driving unit. The control unit further comprises a current sensor module for sensing variations in the first supply current and a control module arranged to control the first supply current in accordance with the adjustment instructions and the sensed variations. By separating the control module from the driving unit, functionality of the control module may be shared over multiple driving units.

17 Claims, 2 Drawing Sheets

(51) Int. Cl.
*B62D 35/00* (2006.01)
*B60R 16/023* (2006.01)
*B60R 16/03* (2006.01)
*H02P 5/68* (2006.01)
*H02P 7/00* (2016.01)
*B60W 50/04* (2006.01)

(52) U.S. Cl.
CPC ............ *B60W 10/30* (2013.01); *B62D 35/00* (2013.01); *H02P 5/68* (2013.01); *H02P 7/0094* (2013.01); *B60W 2050/046* (2013.01)

(58) Field of Classification Search
CPC ......... B62D 35/00; H02P 5/68; H02P 7/0094; Y02T 10/88; B60Y 2200/91; B60Y 2400/3084
USPC .......................................................... 701/71
See application file for complete search history.

(56) References Cited

U.S. PATENT DOCUMENTS

| | | | |
|---|---|---|---|
| 6,692,130 | B1 | 2/2004 | Snow |
| 6,827,141 | B2 * | 12/2004 | Smith ................ B60H 1/00842 237/12.3 A |
| 8,118,124 | B2 | 2/2012 | Shin et al. |
| 9,683,463 | B2 | 6/2017 | Juchymenko |
| 10,112,727 | B1 * | 10/2018 | Cutler .................... B64D 45/00 |
| 2004/0110459 | A1 | 6/2004 | Snow |
| 2004/0130182 | A1 | 7/2004 | Bangle et al. |
| 2010/0018207 | A1 | 1/2010 | Juchymenko |
| 2010/0243351 | A1 | 9/2010 | Sakai |
| 2010/0295391 | A1 | 11/2010 | Perkins |
| 2011/0048691 | A1 | 3/2011 | Shin et al. |
| 2011/0118945 | A1 | 5/2011 | Mochizukii |
| 2012/0043146 | A1 | 2/2012 | Schneider |
| 2012/0132474 | A1 | 5/2012 | Charnesky et al. |
| 2012/0184405 | A1 | 7/2012 | Morimura et al. |
| 2013/0043820 | A1 | 2/2013 | Knezevic |
| 2013/0147619 | A1 | 6/2013 | Shin et al. |
| 2013/0268164 | A1 | 10/2013 | Sugiyama |
| 2014/0025262 | A1 | 1/2014 | Eggeling et al. |
| 2014/0039765 | A1 | 2/2014 | Charnesky et al. |
| 2014/0288760 | A1 | 9/2014 | Asano et al. |
| 2014/0297081 | A1 | 10/2014 | Asami et al. |
| 2014/0346809 | A1 | 11/2014 | Lee et al. |
| 2015/0123624 | A1 * | 5/2015 | Ookawa ................ B60W 10/08 322/22 |
| 2015/0217633 | A1 | 8/2015 | Huijzers et al. |
| 2021/0236681 | A1 | 8/2021 | Eberle et al. |
| 2021/0300174 | A1 | 9/2021 | Sui et al. |

FOREIGN PATENT DOCUMENTS

| | | |
|---|---|---|
| CN | 203995651 U | 12/2014 |
| CN | 204623367 U | 9/2015 |
| CN | 105882349 A | 8/2016 |
| DE | 202013002675 U1 | 4/2013 |
| DE | 102013214754 A1 | 2/2014 |
| EP | 2233342 A1 | 9/2010 |
| JP | 2010221981 A | 10/2010 |
| JP | 2013147072 A | 8/2013 |
| JP | 2013216186 A | 10/2013 |
| JP | 2015093665 A | 5/2015 |
| JP | 2015528767 A | 10/2015 |
| KR | 20130016795 A | 2/2013 |
| KR | 101252555 B1 | 4/2013 |
| KR | 20140026788 A | 3/2014 |
| KR | 10-2015-0034169 | 4/2015 |
| KR | 20160050792 A | 5/2016 |
| KR | 20160079208 A * | 7/2016 |
| KR | 20160081140 A | 7/2016 |
| KR | 20180068187 A * | 6/2018 |
| WO | 2014007617 A1 | 1/2014 |

* cited by examiner

CONTROL MODULE FOR ADJUSTING FLAPS OF A VEHICLE

CROSS REFERENCE TO RELATED APPLICATION

This application is a continuation application, and claims the benefit of U.S. Non-Provisional application Ser. No. 16/479,869 filed Jul. 22, 2019, which is a 35 USC § 371 National Stage application of International Patent Application No. PCT/NL2018/050047, which was filed Jan. 23, 2018, and Netherlands Patent Application No. 2018212, which was filed Jan. 23, 2017, and are incorporated herein by reference as if fully set forth.

FIELD OF INVENTION

The various aspects and embodiments thereof relate to the field of control modules for controlling actuators for adjusting positions of air guiding flaps in motorised vehicles.

BACKGROUND

Motorised vehicles like cars and lorries comprise a significant amount of parts of which the positions may be adjusted by means of electrically driven actuators. Such parts may be shutters of an active grill shutter system, AGS, an air dam and/or one or more spoilers. The actuators are preferably driven by means of an in-vehicle network system. An example of such system is the LIN (Local Interconnect Network) protocol. An issue with the LIN protocol, but also with other protocols for bus systems for in-vehicle networking is that only a limited amount of actuators may be coupled to and addressed by a central vehicle control unit.

SUMMARY

It is preferred to provide a controller addressing at least one deficiency referenced above. Furthermore, it is preferred to be able to dispose of less expensive actuators than directly addressable actuators.

A first aspect provides a control unit for controlling a first driving unit arranged for adjustment of one or more first air guiding flaps of a motorised vehicle between a first outer position and a second outer position. The control unit comprises a communication module for communicating with a vehicle control network for receiving first adjustment instructions for adjusting the first flap, a power supply module comprising an input power terminal for receiving power from a vehicle power network and a first output power terminal for supplying a first current to the first driving unit. The control unit further comprises a current sensor module for sensing variations in the first supply current and a control module arranged to control the first supply current in accordance with the adjustment instructions and the sensed variations. The current may be measured directly or indirectly. In the latter case, variations in a supply voltage may be measured or otherwise detected.

By separating the control module from the driving unit, functionality of the control module may be shared over multiple driving units. This allows for driving units that cost less than driving units with full control functionality built in. Furthermore, the communication module may be addressed by means of a single address with a message that comprises instructions for one of more driving units. Hence, the control module may also act as a de-multiplexer, for example by sharing one external address with multiple internal addresses, for example one for each driving unit.

By providing the current sensor module as described above, a position may be derived from sensing the current and monitoring variations in the supply current. The latter point makes further feedback communication superfluous or at least reduces the need for detection elements for providing feedback on positions. Currently available actuators comprise position sensors like annular encoders like potentiometers and are relatively expensive and more than two conductors—wires—are required for feedback. The control unit according to the first aspect requires only two—or in certain cases only one—conductive wires for a connection with a driving unit and no position sensor in the driving unit itself. This results in reduction of a bill of materials.

Dutch patent NL2009105 only partially resolves the issues, as each driving unit disclosed in this publication requires a position sensor, multiple types of driving units are required (master and slave) and the amount of wires is still relatively high.

In an embodiment, the control module is arranged to determine an amount of change in a position of the first driving unit by counting a number of sensed variations in the supply current. Every detected variation may be counted. Alternatively, a multiple of variations may be counted, for example two or three or an amount corresponding to a number of brushes or a number of a DC electromotor.

Electromotors and brushed DC electromotors as commonly used in actuators in the automotive industry, preferably have an uneven amount of commutators for supplying current to coils on their rotors. Each switch of powering of the coils results in a variation of the supply current. Per revolution of the rotor, variations occur in the supply current with an amount that is twice the amount of coils.

In an embodiment, the control module is arranged to determine the first flap is in either the first outer position or the second outer position upon detecting a change in a frequency of variations or a time period between at least two variations.

A simple case on this is when a flap is blocked in its outer position. With the flap rigidly connected to the rotor of the electromotor or rigidly connected to a shaft that is driven by the electromotor via a drivetrain comprising gears, the electromotor will stall if the flap cannot be moved anymore. Stalling of the electromotor will result in a stop of switching supply of the coils in the rotors and hence, a stop in variations in the supply current. Otherwise, the flap is connected to the driving unit by means of a slipping connection. In such case, the electromotor will revolve with less revolutions if the flap is in an outer position in which it stalls or enter in a slip-stall alternating situation, as the slip torque must be higher than the running torque, so the motor speed will be reduced. In both cases, the number of variations in the supply current, the frequency of the variations, will change compared to normal operation.

In another embodiment, the control module is arranged to obtain a first position of the first flap, determine, based on the first adjustment instructions, a second position of the first flap and determine, based on the first position of the flap and the second position of the flap, a signage of the first supply current to be applied and an amount of variations to occur in the first supply current for the first driving unit to move the flap from the first position to the second position. Subsequently, the first supply current is applied, the amount of variations in the first supply current is counted and the first supply current is switched off if the counted amount is substantially equal to the determined amount.

As the number of variations is more or less linearly coupled to an amount of revolutions of a shaft of an electromotor driving the flap of which the supply current is sensed, a position of the flap may be deduced from a starting position, a sign of the current—positive or negative—and an amount of variations sensed.

In a further embodiment, the power supply module comprises a second power output terminal arranged to supply power to a second driving unit, the current sensor module is further arranged to sense variations in a second supply current provided to the second driving unit, and the control unit is further arranged to control the second supply current in response to the adjustment instructions and the sensed variations.

In such embodiment, intelligence is provided in the control unit. This allows relatively simple actuators to be used as driving units. Furthermore, as discussed above, such control unit acts as a demultiplexer.

In again another embodiment, the control unit is arranged to cause the power supply module to provide substantially the same supply current to the first driving module and the second driving module. The control unit is further arranged to count a first amount of variations in the first supply current and a second amount of variations in the second supply current. A malfunction of the first driving module is determined if the first amount of variations differs more than a pre-determined amount from the second amount. Optionally, operation of more than two actuators may be monitored in this way.

With substantially the same driving units provided with substantially the same current, substantially the same amount of variations are expected to be counted in both supply currents. If this is not the case, there is a malfunction in either one of the driving units.

In yet a further embodiment, the first power output terminal comprises one or two conductive contact points for supplying the first supply current to the first driving unit. As driving of the driving units is controlled in response to data measured in the supply current, no further electronics and no further communication between the control unit and the driving unit(s) is required. Hence, two and in some cases only one conductive wire is required between the control unit and the driving unit. In the latter case, one conductive wire is replaced by, for example, the frame of the vehicle.

A second aspect provides a driving system for adjustment of one or more first air guiding flaps of a motorised vehicle, comprising the control unit of the first aspect and a driving unit for adjusting the first flap.

A third aspect provides a motorised vehicle comprising the driving system according to the second aspect.

BRIEF DESCRIPTION OF THE DRAWINGS

The various aspects and embodiments thereof will now be discussed in conjunction with drawings. In the drawings.

DETAILED DESCRIPTION OF THE PREFERRED EMBODIMENT(S)

Figure 1:
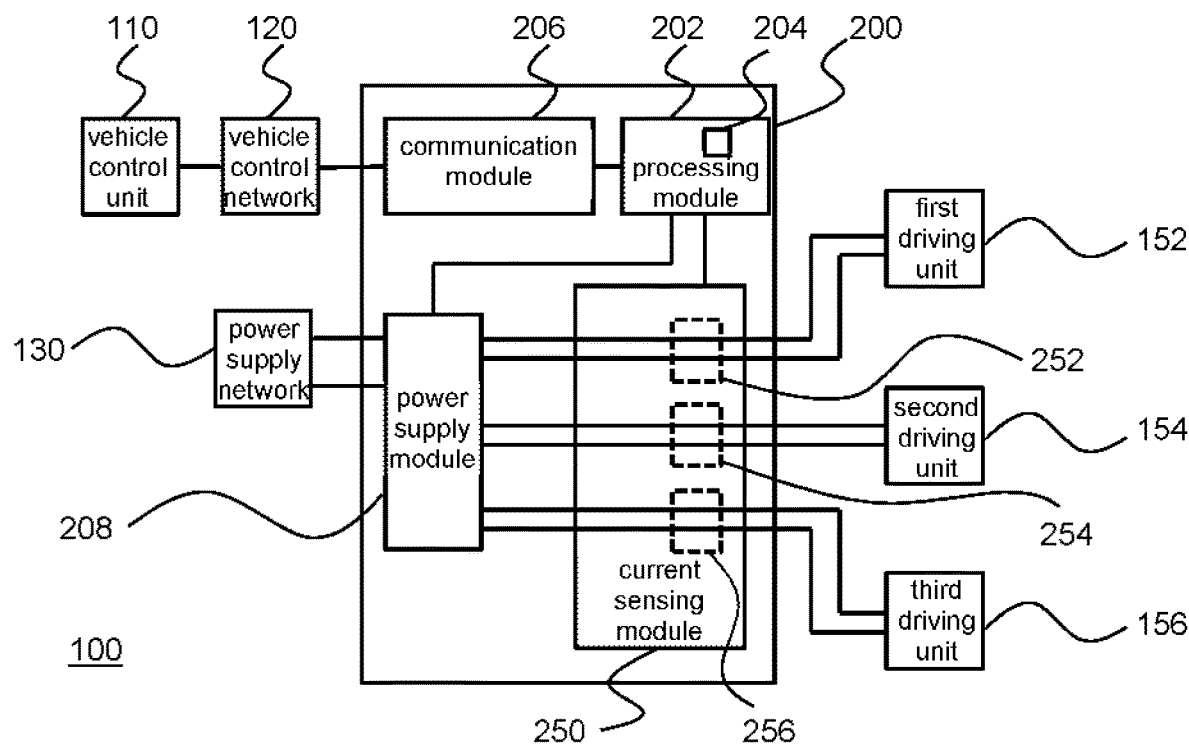
FIG. 1: shows a schematic representation of a control network.

FIG. 1 shows a control system 100 for a motorised vehicle and a car in particular. This may be a car having a combustion engine, an electromotor suitable for propelling the car or both. The control system 100 comprises a driver control unit 200, connected to a vehicle control unit via a vehicle control network 120 and receiving instructions therefrom. The vehicle control network 120 preferably comprises a bus system that is arranged for exchanging data in accordance with the LIN (Local Interconnect Network) protocol. The driver control unit 200 is also contacted to a vehicle power supply network 130 that preferably comprises a battery.

The driver control unit 200 comprises a communication module 206, a processing module 202 comprising a memory module 204, a power supply module 208 and a current sensing module 250. Alternatively or additionally, the memory module 204 is located outside the processing module 202. The driver control unit 200 is connected to a first driving unit 152, a second driving unit 154 and a third driving unit 152 and arranged to control the driving units. In other embodiments, the driver control unit 200 is arranged to control more or less driving units, preferably between one and twelve or any number therein in between. In another embodiment, the driver control unit 200 is arranged to control even more driving units.

The driving units are arranged for driving air guiding flaps of a vehicle. More in particular, the driving units are arranged for moving the flaps between a first outer position and a second outer position. At least one of the driving units may be provided in one and the same housing as the driver control unit 200. Alternatively, the driving units and the driver control unit 200 are provided in separate housings.

The communication module 206 is arranged to communicate with the vehicle control unit 110 via a vehicle control network 120 and receiving instructions therefrom. The communication module 206 is arranged to be addressed by a single address in accordance with the LIN protocol. The communication module 206 is arranged to derive multiple instructions for multiple driving units from one single message addressed to and received by the driver control unit 200. In such embodiment, different messages may be sent to one LIN address, each message carrying instructions for a different actuator. The different messages may optionally be sent in a round robin fashion. Each different message may comprise a different internal address dedicated to a particular actuator within the LIN address domain of the driver control unit 200.

The processing module 202 is arranged to control the power supply module 208 in accordance with instructions received from the vehicle control unit 110, preferably via the communication module 206.

The power supply module 208 is arranged for providing a supply current to the various driving unit. The current to be supplied by the power supply module 208 is derived from the vehicle power supply network 130. The power supply module 208 is arranged to provide the supply currents in accordance with instructions received from the processing module 202. The power supply module 208 is in this embodiment connected to each driver with two conductors like wires. In one embodiment, the current is provided in a first direction for moving a flap in the direction of the first outer position an in a second direction for moving the flap in a direction of the second outer position. Alternatively or additionally, the power supply module is arranged for adjusting magnitude of the supply current. By adjusting the supply current, the intended speed of the flap may be adjusted. Furthermore, certain driving units may require less current than others.

The driver control unit 200 further comprises current sensing module 250. The current sensing module 250 is operatively connected to the conductive wires between the power supply module 208 and the driving units for sensing the current through at least one of the wires of each pair of wires. The current sensing module 250 comprises in the embodiment shown by FIG. 1 a first current sensing unit 252 for sensing current supplied to the first driving unit 152, a second current sensing unit 254 for sensing current supplied to the second driving unit 154 and a third current sensing unit 256 for sensing current supplied to the third driving unit 156.

In another embodiment, the current sensing module 250 comprises less, possibly only one, current sensing unit for sensing currents provided to multiple driving units. The or each current sensing unit samples the current supplied to driving units. Hence, current sensing may take place in the digital or analogue domain. In case of sampling, the sampling frequency is preferably at least twice as high as the expected amount of revolutions per second, multiplied by an amount of commutators comprised by each electromotor and/or an amount of powered coils on the rotor.

The currents may be sensed by means of Hall sensors, resistive measurements, capacitive inductive couplings, any kind of electronic couplings, other, or a combination thereof. The current sensing elements may be provided separate from the power supply module 208 as depicted by FIG. 1 or, alternatively or additionally, be implemented in the power supply module 208 itself. Hence, the current may be sensed as it is supplied, as it is provided through the one or more—preferably two—wires providing the current to the driving unit, in another way, or a combination thereof.

The driving units each comprise at least one electromotor—but may comprise more—and may optionally comprise a one or more drive trains for reducing drive speed and increasing torque or increasing drive speed. To this objective, the driving units may comprise gears, worm wheels (helical gears), other mechanical elements or a combination thereof. The driving units preferably do not comprise any electronic components.

Figure 2:
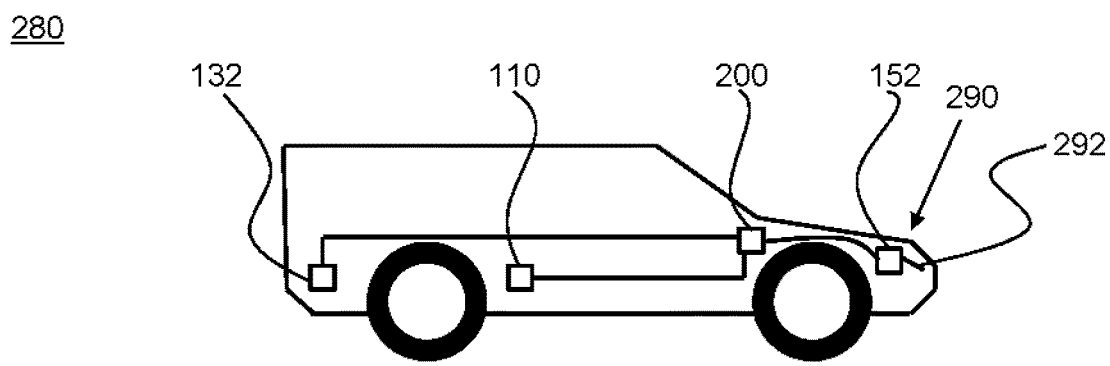
FIG. 2: shows a schematic representation of a car.

FIG. 2 shows a car 280 as a motorised vehicle comprising the system 100. The various components of 100 may be distributed over the car. At the back of the car, a battery 132 is provided for providing electrical power to the vehicle power supply network 130. In the middle of the car, the vehicle control unit 110 is located. The driver control unit 200 is located in the front of the car, preferably close to the first driving unit 152. The first driving unit 152 is connected to a flap 292 of an active grill shutter (AGS) system 290. In another embodiment, the first driving unit 152—or any of the other driving units—is arranged for adjusting the position of another air guiding flap, including, but not limited to any spoilers and the like for adjusting airflow at the back, front, top and/or bottom of the car 280 or a combination thereof.

As indicated, the first driving unit 152, the second driving unit 154 and the third driving unit 156—and optionally more or less driving units—are preferably connected to the power supply module 208 by means of one or two conductive wires. In case only one conductive wire is provided, a return path for current may be provided via the framework of the car 280. As the latter option may result in receiving a lot of noise in the connection between the driving units and the power supply module (and the sensed current, this is not a preferred embodiment. However, with the application of the right electronics, such embodiment is explicitly not excluded. As indicated above, the driving units preferably do not comprise any electronics. Yet, for preferred operation of the car 280, it is preferred the driver control unit 200 controls the driving units such that positions of the controlled flaps may be relatively accurately controlled.

To this objective, the current sensing module 250 is provided. The current sensing module 250 is coupled to the processing module 202 such that the processing module 202 is able to detect certain variations in currents supplied to the driving units to that objective, the current sensing module may comprise one or more high-pass or bandpass filters, one or more peak detectors, one or more zero crossing detectors, other electronic modules or a combination thereof.

The electromotors comprised by the driving units are preferably direct current motors and more in particular, brushed DC motors having three or more coils in the rotor. At each change of powering of the coils in the rotor, a variation occurs in the supply current provided to the driving unit. In conjunction with the current sensing module 250, the processing module 202 is arranged to count these variations. The number of variations counted may be used for determining an end position of the flap 292.

Figure 3:
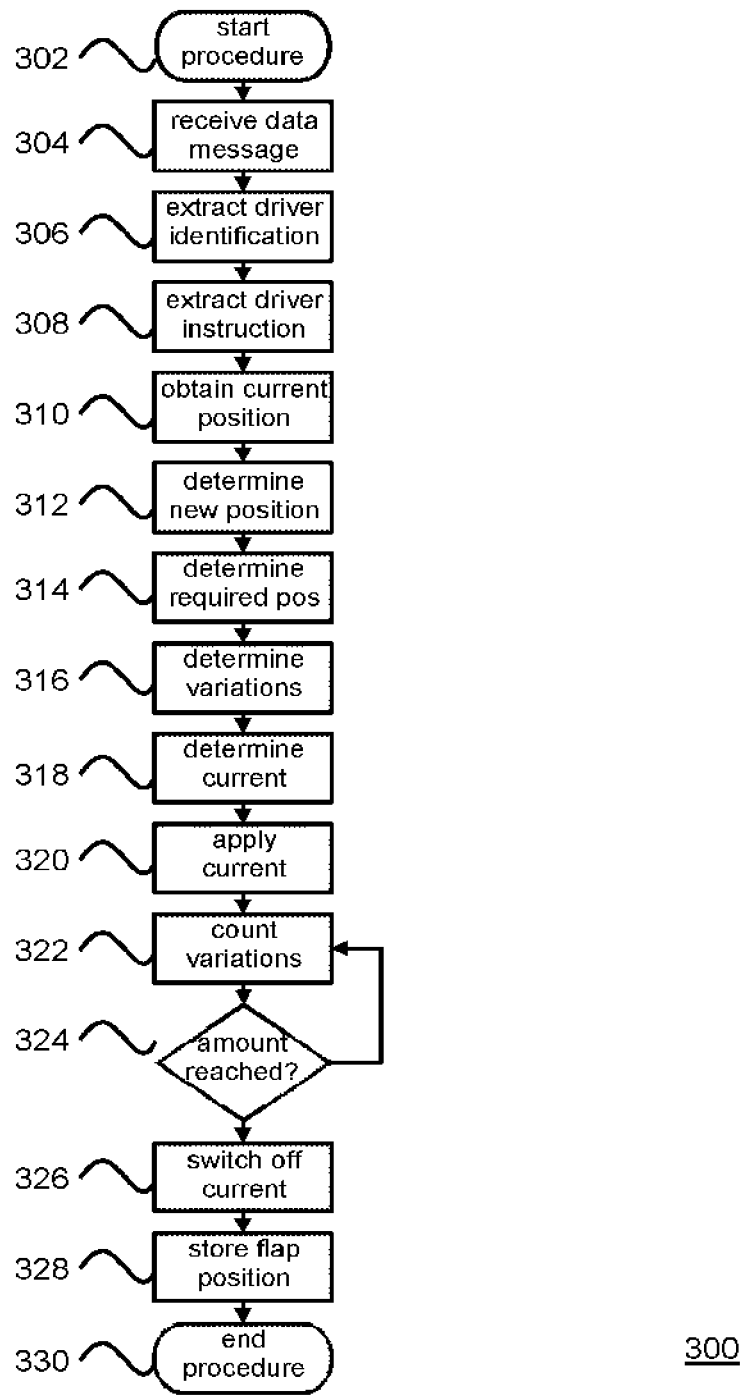
FIG. 3: shows a flowchart.

FIG. 3 shows a flowchart 300 for receiving and processing of a data message through the vehicle control network 120 and for driving a driving unit such that the position of the flap 292 is adjusted to a position in accordance with instructions received. This will be discussed in further detail in conjunction with a flowchart 300 shown by FIG. 3. The various parts of the flowchart 300 are briefly summarised in the list below and will be discussed in further detail further below.

302 start process
304 receive data message
306 extract driver identification
308 extract driver instruction data
310 obtain current position data for flap
312 determine new position of flap
314 determine required movement of flap
316 determine amount of current variations during movement
318 determine current to be applied
320 apply determined current
322 count variations in supplied current
324 determined amount reached?
326 switch off current
328 store position of flap
330 end procedure The procedure starts in a terminator 302 an proceeds to step 304 with the driver control unit 200 receiving data message from the vehicle control unit 110 via a vehicle control network 120 by means of the communication module 206. The communication module 206 may transfer the whole data message to the processing module 202. Subsequently, the processing module 202 extracts an identifier of a driving module to which the data in the data message relates. Alternatively, the communication module 206 determines what driving unit the data in the receive message is related to.

In step 308, the processing module 220 obtains instruction data for the identified driving module from the receive message. The instruction may comprise an indication of a position of a particular flap, either as an absolute number or as a ratio between a first outer position and a second outer position. Alternatively or additionally, the instructions indicate a particular amount of movement of the flap.

In step 310, a current position of the flap 292 to be adjusted is obtained, preferably from the memory module 204. This position may be stored previously after receiving a previous adjustment instruction and/or execution thereof. Alternatively or additionally, a calibration step is provided to determine the position of the flap 292. To this end, the flap 292 is firstly moved to one of its outer positions. The processing module 202 is arranged to detect arrival of the flap 292 at an outer position when no more or less variations are sensed in the current provided to the applicable driving unit.

In this embodiment, information is stored in the memory module 204 for determining how many variations are to be counted in the supply current to arrive at a position in accordance with received instructions. For example, an amount of variations or an amount of revolutions to be counted are stored in the memory 204, optionally with an amount of variations per revolution. Such information may be pre-stored. In another embodiment, the information may be determined by moving the flap 292 between the first outer position and the second outer position and counting the amount of variations over this trajectory. In this way, an amount of variations can be coupled to a position between the first outer position and the second outer position.

In step 312, based on the instruction received, the processing module 202 determines a new position of the flap 292. In step 314, based on the current position of the flap 292 as retrieved from the memory module 204 and the received instruction, a required movement of the flap 292 is determined for arriving at a position in accordance with the received instructions. The required movement may be determined as such, as an actual movement of the flap or the electromotor comprised by the driving unit. Alternatively or additionally, the movement may be determined by means of other indicators.

Such indicators for an amount of movement may be variations in the supply current to be applied. With data on characteristics of the electromotor and in particular with a known amount of variations in the supply current per revolution of the rotor and with data on a transfer between movement of the rotor and movement of the flap 292, a number of variations in the supply current may be determined. These variations are to occur while the electromotor operates to move the flap 292 from its current position to the intended position.

In step 318, the current to be applied is determined. It is noted this step may also be determined prior to step 314 or prior to step 316. With determining the current, most important to be determined is the direction or the signage of the current to be applied. With the current applied in a first direction, the flap 292 will move towards the first outer position and with the current applied in a second direction, the flap 292 will move towards the second outer direction. Additionally, the magnitude of the current to be applied may be determined.

In one embodiment, the magnitude of the current applied is always substantially the same. With substantially the same, an intended average of the magnitude of the current is indicated. As discussed above, variations may occur around, above or below the intended average. Furthermore, as perfect current sources are not available, certain variations in the supply current may occur due to a state of the driving unit to which the current is provided. If the electromotor of the driving unit stalls, the actual current may increase above an intended level, as the voltage applied may change little.

With the magnitude and sign of the current to be applied determined and the amount of variations expected during the movement determined, the determined current is applied to the driving unit in step 320. Upon application of the current to the driving unit, the amount of variations in the driving current is counted. The number of variations in the driving current is sensed by means of the current sensing module 250 and in particular by the current sensing unit operatively connected to the conductors through which the applied current runs. In one embodiment, the current sensing module 250 comprises electronics for determining the variations in the supply current and for providing a digital and preferably binary signal to the processing module 202 at the moment a variation occurs. Alternatively, the occurrence of a variation is determined by the processing module 202.

Based on the sensing of variations, the processing module 202 counts the detected variations in step 322. In step 324, the counted amount is compared with the amount determined in step 316. If the counted amount of variations is substantially the same as the determined amount and preferably exactly the same, the procedure proceeds to step 326 in which the supply current to the driving unit is switched off. If the counted amount of variations is less than the amount determined in step 316, the process branches back to the 322 from step 324. After the current is switched off in step 326, the position of the flap at which the flap has arrived, is stored in the memory module 204. Subsequently, the procedure ends in terminator 330.

As indicated, the driver control unit 200 is preferably arranged for driving multiple driving units as actuators. The multiple driving units may drive one and the same flap, if driving of the flap requires more power than one single driving unit can provide. In such case, the driving units driving one and the same flap may be addressed using one single internal address, internal in the driver control unit. Furthermore, substantially synchronous operation of the driving units is preferred if they drive one and the same flap. The internal addresses of the driving units, allow the power supply module 208 to apply a supply current to a particular driving unit, either directly or with support of the processing module 202. Alternatively, two driving units driving one and the same flap are addressed using different (internal) addresses.

If different driving units drive different flaps, they are preferably addressed by means of different addresses, even if two different flaps are to be move substantially synchronously. Either addressed by a single address or by two different addresses, with two driving units driven simultaneously, the driver control unit 200 is arranged to detect errors in functionality of the driver units. In this embodiment, the driver control unit 200 provides supply current to the first driving unit 152 and the second driving unit 154. The current to the first driving unit 152 is sensed by means of the first current sensing unit 252 and the current through the second driving unit 154 is monitored by means of the second current sensing unit 254. The first driving unit 152 and the second driving unit 154 are driven substantially synchronously, from and to substantially equivalent positions.

In supply currents to the first driving unit 152 and the second driving unit 154, the variations are sensed, determined and/or counted. Provided the first driving unit 152 and the second driving unit 154 are substantially the same, the amounts of variations in the supply currents to both driving units should be substantially the same over time. If this is not the case, it is determined the driving unit of which in the supply current the least amount of variations is counted is considered to malfunction. In particular if no variations are counted in a supply current, the connected and driven driving unit is considered to malfunction. In another embodiment, the driving unit of which the amount of counted pulses is higher may be determined to malfunction and optionally to be defect.

In another embodiment, it is detected that a flap controlled by a driving unit is moved to one of its outer positions if an amount of variations counted to occur in the supply current counted per time unit decreases over time. In particular if no variations are sensed while a supply current is provided and sensed, it is determined an outer position of the flap is detected, as this is an indication the electromotor comprised by the driving unit does not make any revolutions. Alternatively, it may be determined the flap actuated is blocked otherwise. For example, a shutter of an AGS system may be blocked by a twig stuck between two shutters.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

In the description above, it will be understood that when an element such as layer, region or substrate is referred to as being "on" or "onto" another element, the element is either directly on the other element, or intervening elements may also be present.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

What is claimed is:

1. A control unit for controlling a first driving unit and a second driving unit, the control unit comprising:
    a communication module for communicating with a vehicle control network and arranged to receive a single data message from the vehicle control network and to extract, from the single data message, first adjustment instructions for driving the first driving unit and second adjustment instructions for driving the second driving unit;
    a power supply module comprising an input power terminal for receiving power from a vehicle power network and a first output power terminal for supplying a first supply current to the first driving unit and a second output power terminal for supplying a second supply current to the second driving unit;
    a current sensor module for sensing variations in the first supply current and the second supply current; and
    a control module arranged to control the first supply current in accordance with the first adjustment instructions and the sensed variations of the first supply current and to control the second supply current in response to the second adjustment instructions and the sensed variations in the second supply current,
    wherein the first driving unit is arranged for adjustment of a first air guiding flap and the second driving unit is arranged for adjustment of the first air guiding flap or a second air guiding flap of a motorised vehicle between a first outer position and a second outer position.

2. The control unit according to claim 1, wherein the control module is arranged to determine at least one of:
    an amount of change in a position of the first driving unit by counting a number of the sensed variations in the first supply current; and
    an amount of change in a position of the second driving unit by counting a number of the sensed variations in the second supply current.

3. The control unit according to claim 1, wherein the control module is arranged to determine at least one of:
    a speed of the first driving unit based on a time interval between at least two of the sensed variations in the first supply current; and
    a speed of the second driving unit based on a time interval between at least two of the sensed variations in the second supply current.

4. The control unit according to claim 3, wherein the control module is arranged to determine the first air guiding flap is in either the first outer position or the second outer position upon detecting a change in a frequency of at least one of the sensed variations in the first supply current or the sensed variations in the second supply current or a time period between at least two of the sensed variations.

5. The control unit according to claim 4, wherein the control module is configured to determine the first air guiding flap is in either the first outer position or the second outer position upon not detecting variation in the first supply current.

6. The control unit according to claim 1, wherein the control module is configured to:
    obtain a first position of the first air guiding flap;
    determine, based on the first adjustment instructions, a second position of the first air guiding flap;
    determine, based on the first position of the first air guiding flap and the second position of the first air guiding flap, a signage of at least one of: the first supply current to be applied and a determined amount of variations to occur in the first supply current for the first driving unit to move the first air guiding flap from the first position to the second position; and the second supply current to be applied and a determined amount of variations to occur in the second supply current and for the second driving unit to move the first air guiding flap from the first position to the second position;
    apply at least one of the first supply current and the second supply current;
    count an amount of variations in at least one of the first supply current and the second supply current;
    perform at least one of:
        switch off the first supply current when the amount of variations counted is substantially equal to the determined amount of variations in the first supply current; and
        switch off the second supply current when the amount of variations counted is substantially equal to the determined amount of variations in the second supply current.

7. The control unit according to claim 1, wherein the control unit is arranged to:
    cause the power supply module to provide substantially the same supply current to the first driving unit and the second driving unit;
    count a first amount of variations in the first supply current and a second amount of variations in the second supply current;
    determine a malfunction of the first driving unit when the first amount of variations differs more than a predetermined amount from the second amount of variations.

8. The control unit according to claim 1, wherein the control unit is configured to provide substantially a same current level to the first driving unit and to the second driving unit.

9. The control unit according to claim 1, wherein the first power output terminal comprises one or two conductive contact points for supplying the first supply current to the first driving unit.

10. The control unit according to claim 1, wherein the communication module is arranged to communicate with the vehicle control network via a bus system.

11. The control unit according to claim 1, wherein at least one of the first air guiding flap or the second air guiding flap are shutters of an engine compartment of the motorised vehicle.

12. A driving system for adjustment of at least one of the first air guiding flap or the second air guiding flap of a motorised vehicle, comprising the control unit of claim 1 and the first driving unit for adjusting the first air guiding flap and the second driving unit for adjusting one of the first air guiding flap and the second air guiding flap.

13. The driving system according to claim 12, wherein the control unit, the first driving unit, and the second driving unit are provided in separate housings and the first driving unit and the second driving unit are each connected to the control unit through two conductive wires.

14. The driving system according to claim 12, wherein the control unit and the first driving unit are provided in a single housing.

15. A motorised vehicle comprising the driving system according to claim 12 and the first air guiding flap, wherein the first air guiding flap is actuatable by the first driving unit.

16. The motorised vehicle according to claim 15, wherein the first air guiding flap is actuatable by the first driving unit and the second driving unit.

17. The motorised vehicle according to claim 15, further comprising the second air guiding flap, wherein the second air guiding flap is actuatable by the second driving unit.

* * * * *